(12) United States Patent
Wright et al.

(10) Patent No.: US 7,826,804 B1
(45) Date of Patent: Nov. 2, 2010

(54) WIRELESS ANIMAL CALLING SYSTEM AND ASSOCIATED METHOD

(76) Inventors: Patrick Wright, P.O. Box 122, McKenzie, AL (US) 36456; Martha Wright, P.O. Box 122, McKenzie, AL (US) 36456; Frank Depetri, P.O. Box 36078, Canton, OH (US) 44735

( * ) Notice: Subject to any disclaimer, the term of this patent is extended or adjusted under 35 U.S.C. 154(b) by 591 days.

(21) Appl. No.: 11/985,790

(22) Filed: Nov. 16, 2007
(Under 37 CFR 1.47)

Related U.S. Application Data (60) Provisional application No. 60/859,426, filed on Nov. 17, 2006.

(51) Int. Cl.
*H04B 1/40* (2006.01)

(52) U.S. Cl. .................... 455/74; 455/66.1; 455/90.3; 455/84; 455/550.1; 455/552.1; 455/73; 455/575.1; 455/556.1; 119/720; 119/721; 700/245; 348/370; 340/573

(58) Field of Classification Search ............... 455/66.1, 455/90.3, 73, 74, 84, 550.1, 552.1, 575.1, 455/556.1; 119/720, 721; 700/245; 348/370; 340/573
See application file for complete search history.

(56) References Cited

U.S. PATENT DOCUMENTS

| | | | |
|---|---|---|---|
| 4,845,773 A * | 7/1989 | Attallah | 379/102.05 |
| 5,307,053 A * | 4/1994 | Wills et al. | 340/573.1 |
| 7,769,487 B2 * | 8/2010 | Ayers et al. | 700/245 |
| 7,779,788 B2 * | 8/2010 | Moore | 119/721 |
| 2005/0174473 A1 * | 8/2005 | Morgan et al. | 348/370 |
| 2007/0056526 A1 * | 3/2007 | Gianladis et al. | 119/721 |
| 2009/0055019 A1 * | 2/2009 | Stiehl et al. | 700/249 |
| 2009/0127283 A1 * | 5/2009 | Smith et al. | 222/25 |

* cited by examiner

*Primary Examiner*—Matthew D Anderson
*Assistant Examiner*—April G Gonzales (57) ABSTRACT

A communication system includes a housing with a base section and a lid pivotally connected thereto. The housing includes insulating layers positioned along a bottom surface of the base section and an inner surface of the lid. The lid includes a handle coupled to a distal end thereof. A power supply source is seated within the base section, and a power regulating circuit is coupled thereto. A controller is coupled to the power regulating circuit, and a transducer is coupled to the controller. A receiver is seated within the housing and includes a aerial connected thereto. A transmitter and a portable media player are positioned on a body portion of the operator. A receiver transmits a control signal to a controller, and the controller parses the control signal and generates a corresponding output signal that is transmitted to the transducer.

18 Claims, 10 Drawing Sheets

FIG. 11

WIRELESS ANIMAL CALLING SYSTEM AND ASSOCIATED METHOD

CROSS REFERENCE TO RELATED APPLICATIONS

This application claims the benefit of U.S. Provisional Application No. 60/859,426, filed Nov. 17, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to animal calling systems, more particularly, to a wireless animal calling system for transmitting an animal calling signal during hunting conditions.

2. Prior Art

Throughout history, hunters and outdoorsmen have employed various devices to attract their prey. In particular, devices to mimic the calls of deer, moose, elk, water fowl, bear, turkey, and other wild game have been employed. Animal calls have also been employed by animal enthusiasts, wildlife photographers, recreational outdoorsmen and outdoor researchers in non-consumptive wildlife activities.

Rattling horns have been used to call wild game, for example deer. These rattling horns have traditionally been both large and small in size. Large rattling horns have the advantage of producing calls of greater volume, and thus are able to travel long distances and/or penetrate thick cover. However, these large horns are difficult to transport due to their size and bulkiness. Often hunters employ a string or strap tied around the horn and slung over their head, thereby offering the potential for entanglement as the hunter travels through brush or woods. Additionally, these large horns present a safety risk in that other hunters may see the movement of the horn and shoot at the moving horn without first ascertaining that the horn is attached to a hunter and not wild game. Smaller horns have also been employed to combat the size and bulkiness problems. However, smaller horns do not produce the volume of larger horns, therefore, the sound does not travel as well. Smaller horns are also often transported using a string or strap slung over the head presenting the same potential for entanglement.

Other methods employed to call wild game have included rattling bags which are small bags filled with bone chips or other hard material, grunt calls which are mouth operated and employ air and/or grunt sounds blown through the device, and treadle operated sounding devices. Grunt calls use a reed to produce their sound and must be disassembled to adjust a rubber O-ring in order to vary the sound. Treadle operated sounding devices require the hunter to step on a treadle, and thus restricts the hunters movement. Rattling bags, by design, require excessive movement, which may alert the prey. After repeated use of a mouth call on a cold day, the hunter's breath condenses in the call tubing or unit, creating moisture and rendering the call useless. Treadle operated sounding devices not only require excessive movement, they restrict the mobility of the hunter. Bow hunters have employed techniques such as rattling an aluminum arrow against the wooden riser of the bow to call their intended prey. Today, however, the majority of compound bows are manufactured entirely from aluminum, composite or other lightweight metal.

A disadvantage of the aforementioned methods of calling prey is that they are very technique sensitive. As a hunter's skill at shaking, rattling, grunting, or blowing improves, his ability to successfully call and attract his prey increases. Both novice hunter and expert often have difficulty creating realistic sounds and are frustrated in their attempt to call the prey. Additionally, all of these mechanical calls require significant movement on the part of the hunter and this movement often frightens away the prey.

One prior art example shows an electronic game caller comprising a means for receiving a power source in conductive connection with a digital recording circuit. The digital recording circuit is in conductive connection with at least one digital vocalization storage medium. The digital vocalization storage medium is in conductive connection with a user programmable microcircuit, wherein the programmable microcircuit is encoded with instructions for a predetermined sequence of playback and a predetermined pitch, tempo and volume. The programmable microcircuit is in conductive connection with a digital playback circuit.

The digital playback circuit is in conductive connection with at least one digital playback altering circuit. The digital playback altering circuits are in conductive connection with a first amplifier in conductive connection with a first speaker. A transmitter is in conductive connection with the digital playback circuit. A remote receiver is in conductive connection with a second amplifier in conductive connection with a second speaker and a means for receiving a second power source. At least one connected input control is provided. In other, economy forms, any or all of the digital recording circuit, programmable circuit, or remote receiver and second speaker are omitted. Unfortunately, this example does not provide a means for rendering game calls on modern electronic media, via an included selectively operable remote device.

Another prior art example shows an apparatus for use in hunting wild game animals and waterfowl, and more particularly to a weapon mounted wild animal game caller. This weapon mounted wild animal game caller finds particular application in attracting deer. It may be conveniently mounted and attached to an archery bow or to a hunting firearm. The game caller emits a grunting sound which is known to attract game animals, such as deer. The use of the grunter is very desirable for short range hunting making it the choice for many bow hunters. The activation of sound is accomplished by a novel air bladder that is filled with a resilient filamentous polyester type fiber.

When mounted to an archers bow, it is easily operated with the hand even with a fully drawn bow. In an alternative embodiment, the game caller uses an electronic recording system to store a plurality of prerecorded calls, such as deer, geese, duck and the like. The recording media may be either a magnetic tape recorder or a digital synthesizer having a plurality of game calls that are stored in digital memory. The entire game calling system can be worn on one's belt and activated silently by depressing a bow mounted or stock mounted switch. Unfortunately, this example does not provide a means of remotely calling an animal from a location other than that of the hunter.

Accordingly, a need remains for a wireless animal calling system in order to overcome the above-noted shortcomings. The present invention satisfies such a need by providing a system that is convenient and easy to use, is lightweight yet durable in design and transmits an animal calling signal during hunting conditions. Such a system conveniently allows a hunter to position the system in one location while taking an advantageous hunting position in another location. The system effectively allows a hunter to selectively change the game call from such a location through the use of a remote device, thus allowing a hunter to remain stationary during hunting conditions, and reducing the possibility of scaring away the intended prey. The system is simple to operate, is portable and is inexpensive. The system can be adapted for use with many different types of game.

BRIEF SUMMARY OF THE INVENTION

In view of the foregoing background, it is therefore an object of the present invention to provide an apparatus for a wireless animal calling system. These and other objects, features, and advantages of the invention are provided by a communication system for wirelessly transmitting an animal calling signal during hunting conditions.

The system includes a portable housing that has a base section and a lid pivotally connected directly thereto. Such a housing conveniently includes a plurality of insulating layers removably positioned along a bottom surface of the base section and an inner surface of the lid respectively. Such a lid is conveniently provided with a handle pivotally coupled to a distal end thereof. Such a handle is adaptable between raised and lowered positions while the lid is directly mated with the base section.

The lid is further provided with a chamfered top surface effectively defining a groove longitudinally extending along an entire longitudinal length of the housing. Such a groove advantageously terminates above the base section and includes open distal and proximal ends for providing easy access from distal and proximal ends of the housing. A bifurcated casing has pivotally adaptable top and bottom sections nested within the groove. Such a casing securely shields the transmitter (herein described below) housed therein.

The housing further includes a power supply source effectively seated within the base section, and a power regulating circuit electrically coupled directly to the power supply source for selectively adjusting an operating voltage of the communication system during hunting conditions. A controller is electrically coupled to the power regulating circuit, and a transducer is electrically coupled directly to the controller. A receiver is seated within the housing and conveniently includes a telescopically adjustable aerial electrically connected directly thereto.

The housing further includes a transmitter and a portable media player advantageously positioned on a selected body portion of the operator. Such a media player is manually controlled by the user such that selected media files are played back via the transducer upon receiving an instruction from the operator. The media player effectively instructs the transmitter to wirelessly send an RF control signal to the housing. The portable media player preferably includes an electronic media playback device selected from the group including an MP3 player, a compact disc player, a tape recorder and a tuner. Such a control signal bears data corresponding to a selected media file existing within the media player. The receiver effectively transmits the control signal to the controller. Such a controller parses the control signal and generates a corresponding output signal that is transmitted to the transducer such that the transducer advantageously projects an audible signal indicative of the media file housed within the media player.

The transducer conveniently includes a loud speaker provided with an amplifier for increasing a decibel level of the output signal. The housing has a distal end provided a plurality of apertures formed therein. Such apertures are juxtaposed adjacent to the transducer for allowing the output signal to effectively emanate away from the housing during hunting conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-11 by the reference numeral 10 and is intended to provide a wireless animal calling system. It should be understood that the system 10 may be used to call many different types of animals and should not be limited in use to calling only those animals described herein.

Referring initially to FIGS. 1, 2, 3, 4, 5, 6, 7, 8 and 9, the system 10 includes a portable housing 20 that has a base section 21 and a lid 22 pivotally connected directly thereto, without the use of intervening elements. Such a housing 20 includes a plurality of insulating layers removably positioned along a bottom surface of the base section 21 and an inner surface 25 of the lid 22 respectively. Of course, such layers can be produced from a variety of suitable insulating materials, as is obvious to a person of ordinary skill in the art. Such a lid 22 is provided with a handle 26 pivotally coupled to a distal end 27 thereof. Such a handle 26 is adaptable between raised and lowered positions while the lid 22 is directly mated, without the use of intervening elements, with the base section 21.

Referring to FIGS. 1, 2, 3, 4, 5, 6, 7, 8, 9 and 11, the lid 22 is further provided with a chamfered top surface 28 defining a groove 29 longitudinally extending along an entire longitudinal length of the housing 20. Such a groove 29 advantageously terminates above the base section 21 and includes open distal 31 and proximal 32 ends, which is essential for providing easy access from distal 33A and proximal 33B ends of the housing 20. A bifurcated casing 34 has pivotally adaptable top 35 and bottom 36 sections nested within the groove 29. Of course, such a groove 29 can be formed in a variety of shapes and sizes, as obvious to a person of ordinary skill in the art. Such a casing 34 securely shields the transmitter 37 (herein described below) housed therein.

Referring to FIGS. 2, 4, 5, 6, 7, 8, 9 and 10, the housing 20 further includes a power supply source 38 effectively seated within the base section 21, and a power regulating circuit 39 electrically coupled directly to the power supply source 38, without the use of intervening elements, which is critical for selectively adjusting an operating voltage of the communication system 10 during hunting conditions. The power supply 38 is preferably rechargeable, for added convenience. A controller 41 is electrically coupled to the power regulating circuit 39, and a transducer is electrically coupled directly to the controller 41, without the use of intervening elements. A receiver 43 is seated within the housing 20 and includes a telescopically adjustable aerial 44 electrically connected directly thereto, without the use of intervening elements.

Figure 1:
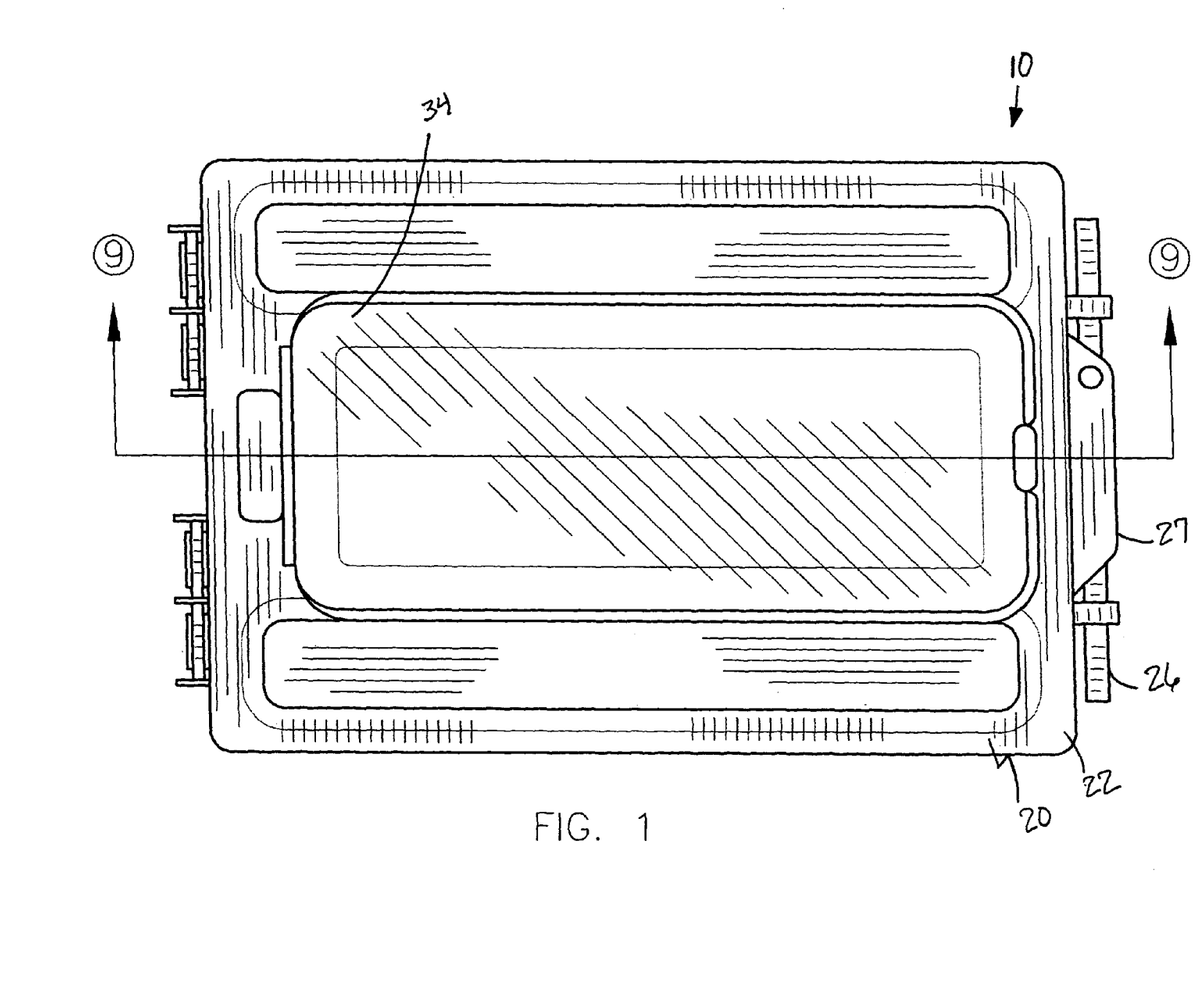
FIG. 1 is a top plan view of a wireless animal calling system, in accordance with the present invention.
Figure 2:
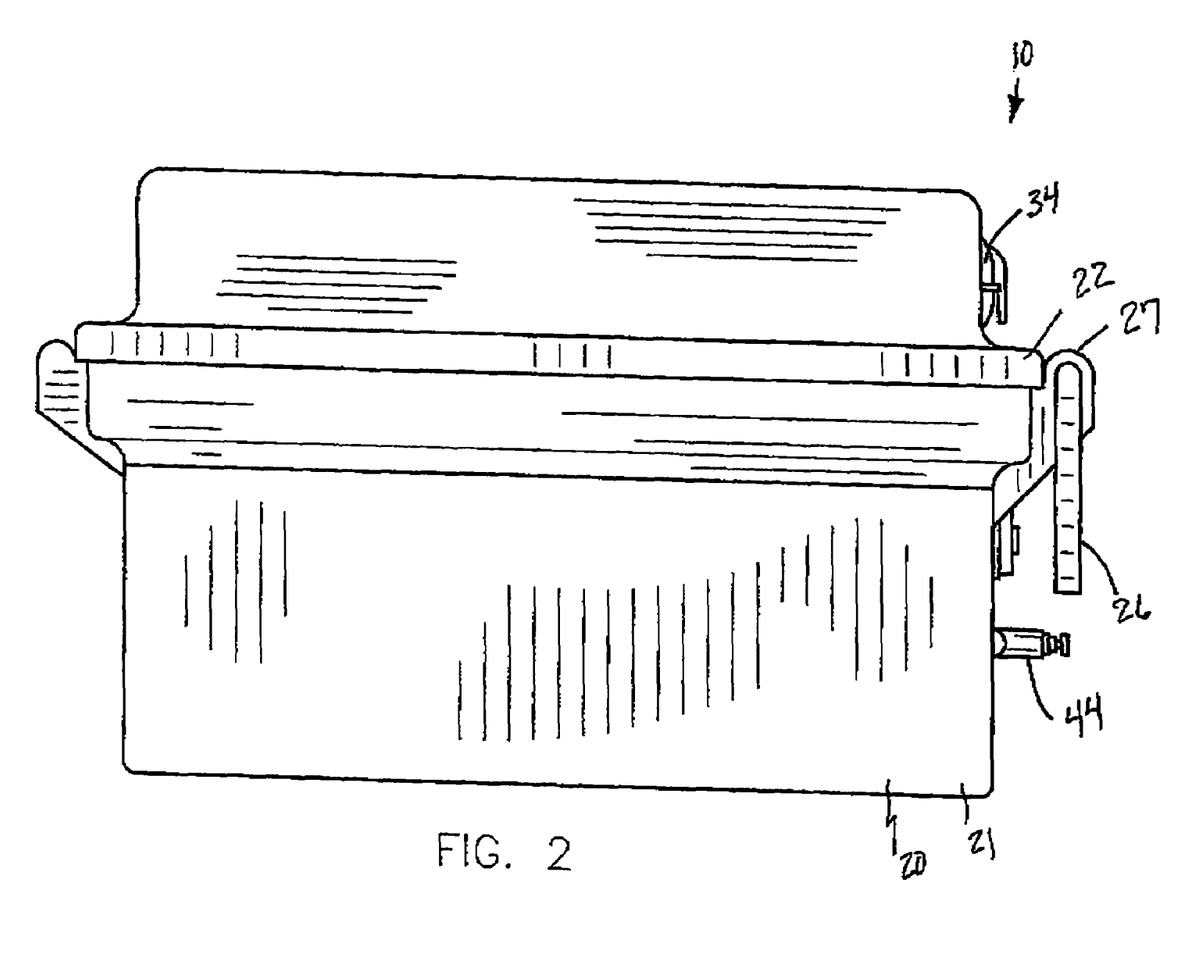
FIG. 2 is a side elevational view of the system shown in FIG. 1.
Figure 3:
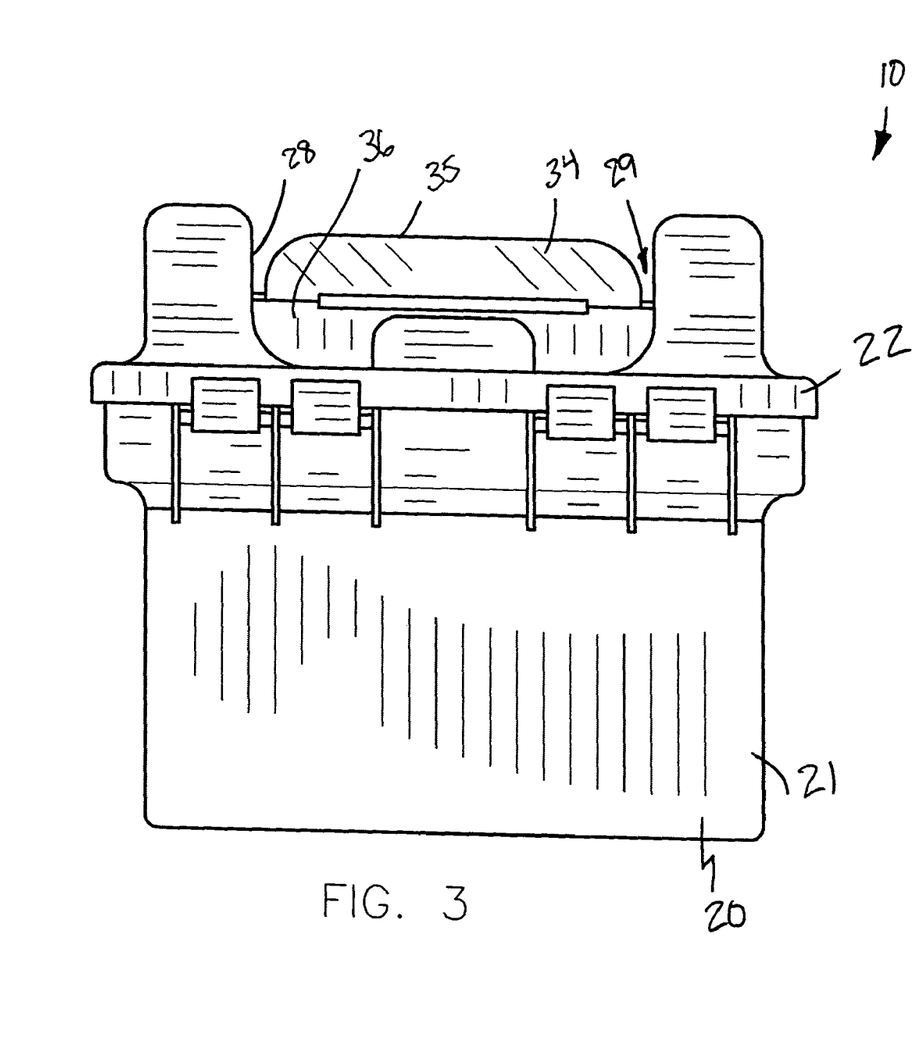
FIG. 3 is a rear elevational view of the system shown in FIG. 1.
Figure 4:
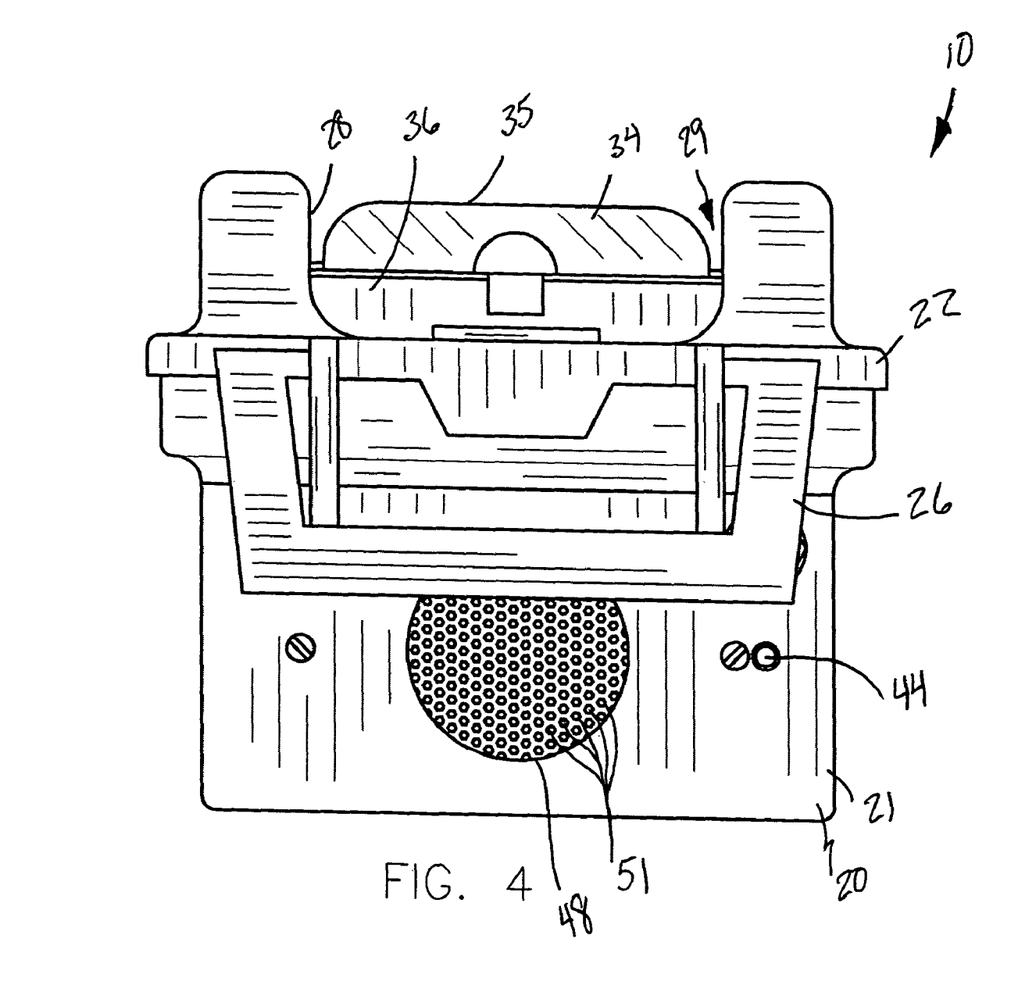
FIG. 4 is a front elevational view of the system shown in FIG. 1, showing the handle in a lowered position.
Figure 5:
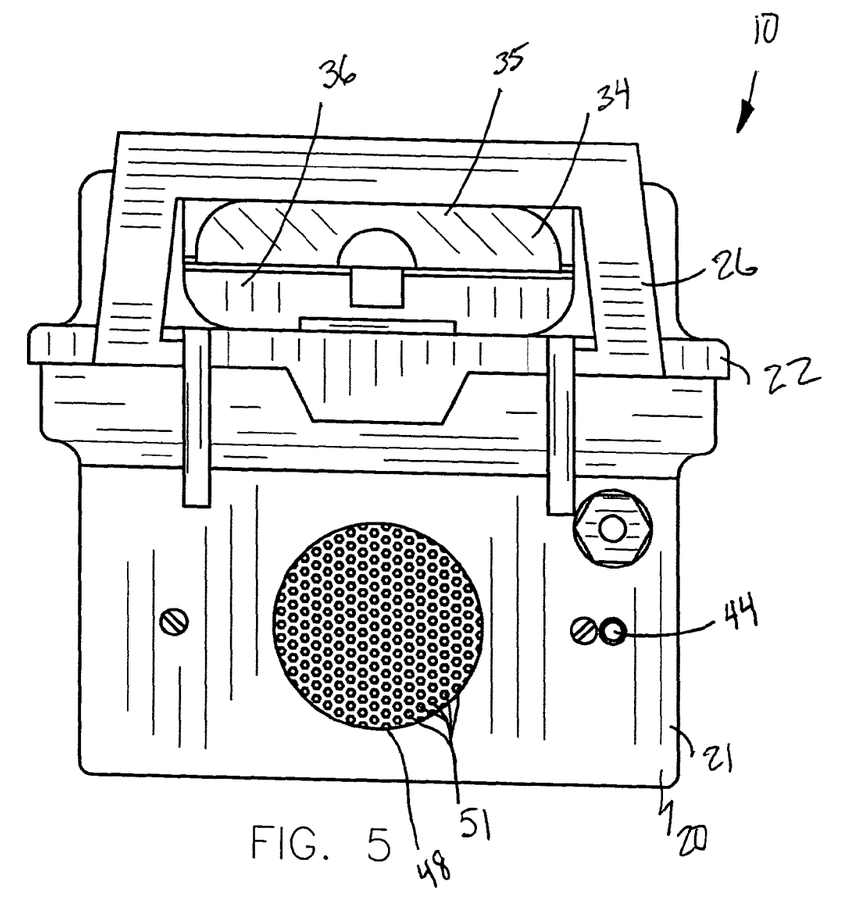
FIG. 5 is a front elevational view of the system shown in FIG. 4, showing the handle in a raised position.
Figure 6:
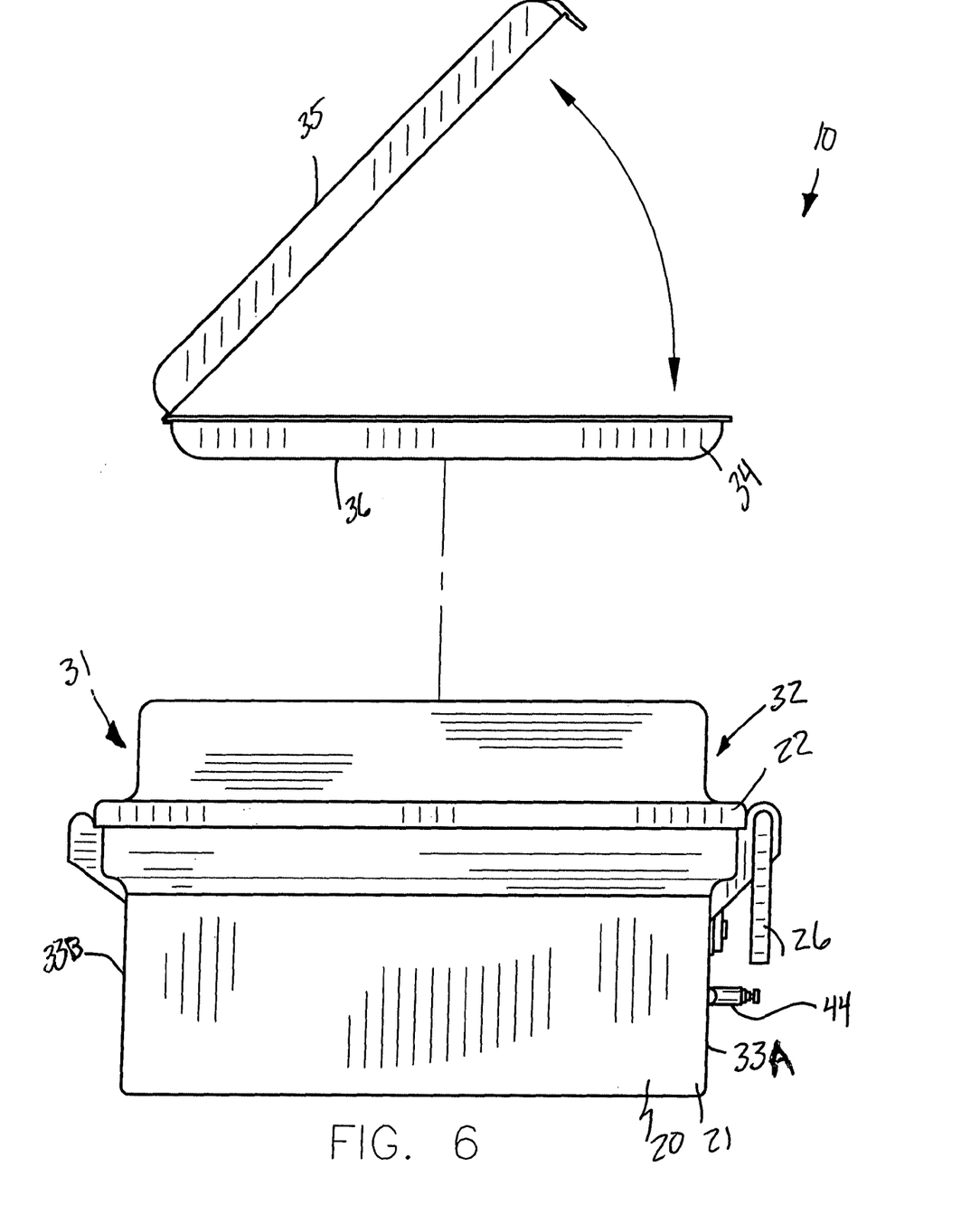
FIG. 6 is a side elevational view of the system shown in FIG. 1, showing the bifurcated case removed from the lid.
Figure 7:
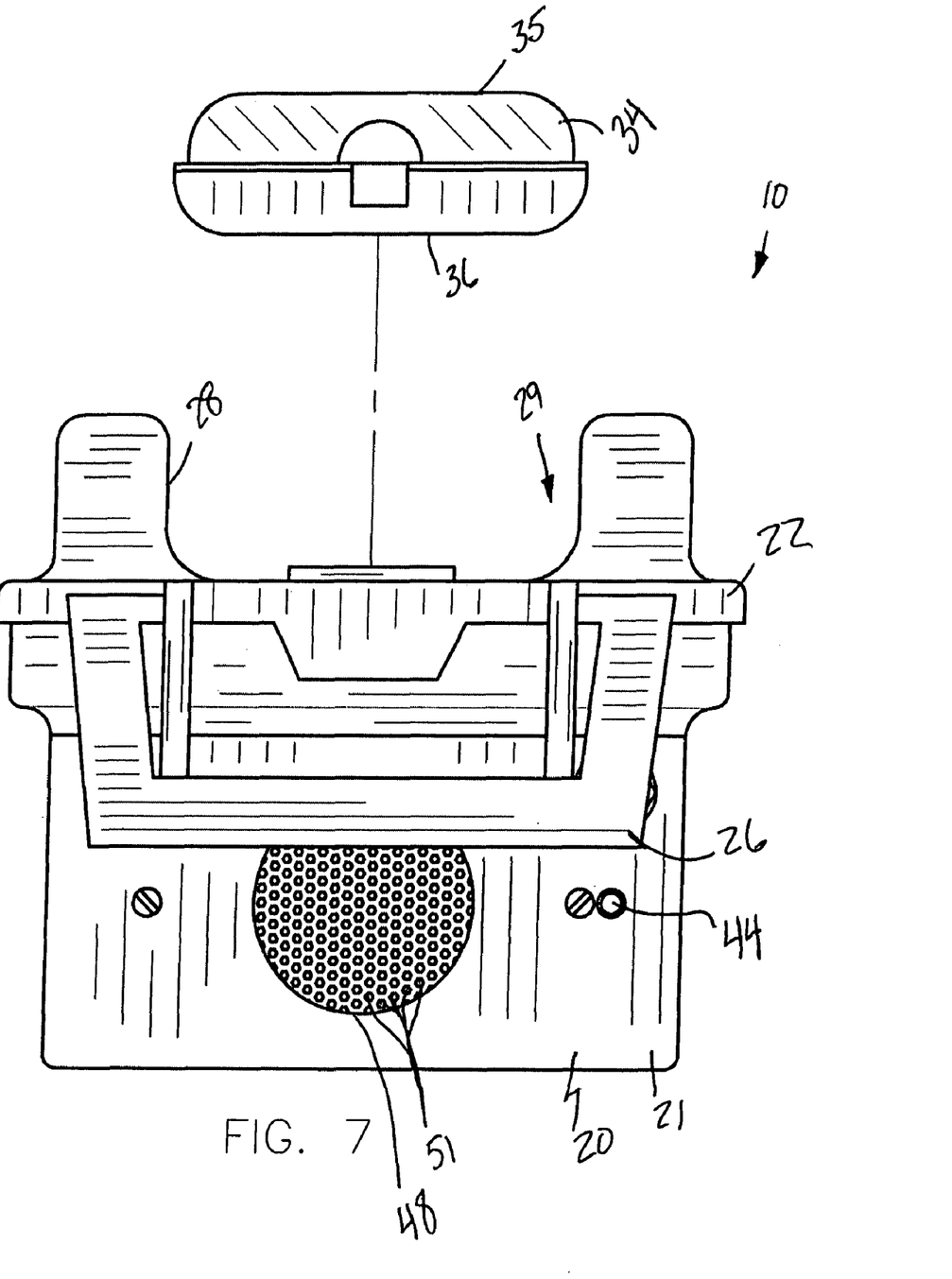
FIG. 7 is a front elevational view of the system shown in FIG. 4, showing the bifurcated case removed from the lid.
Figure 8:
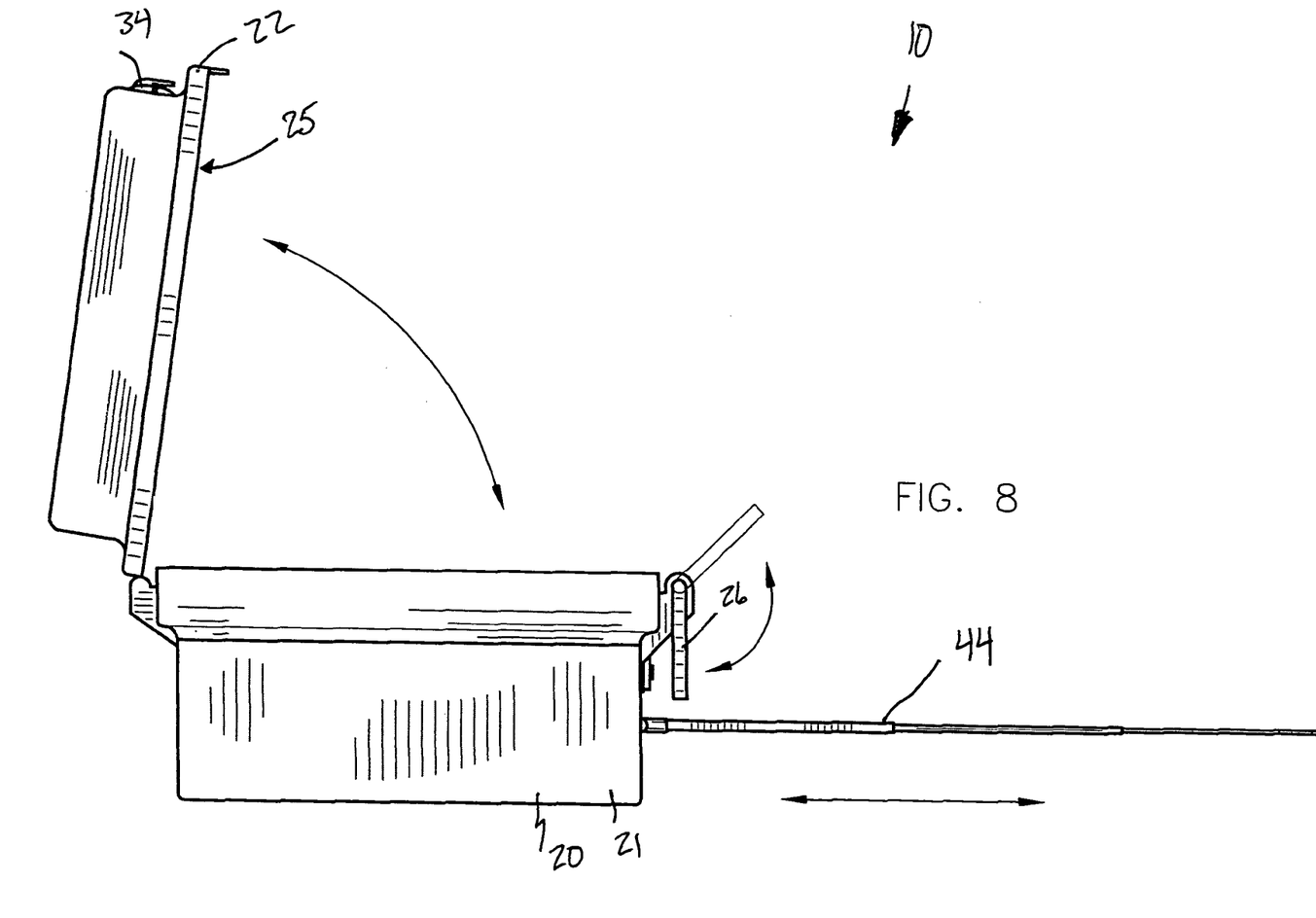
FIG. 8 is a side elevational view of the system shown in FIG. 1, showing the lid in a raised position and the aerial in an extended position.
Figure 9:
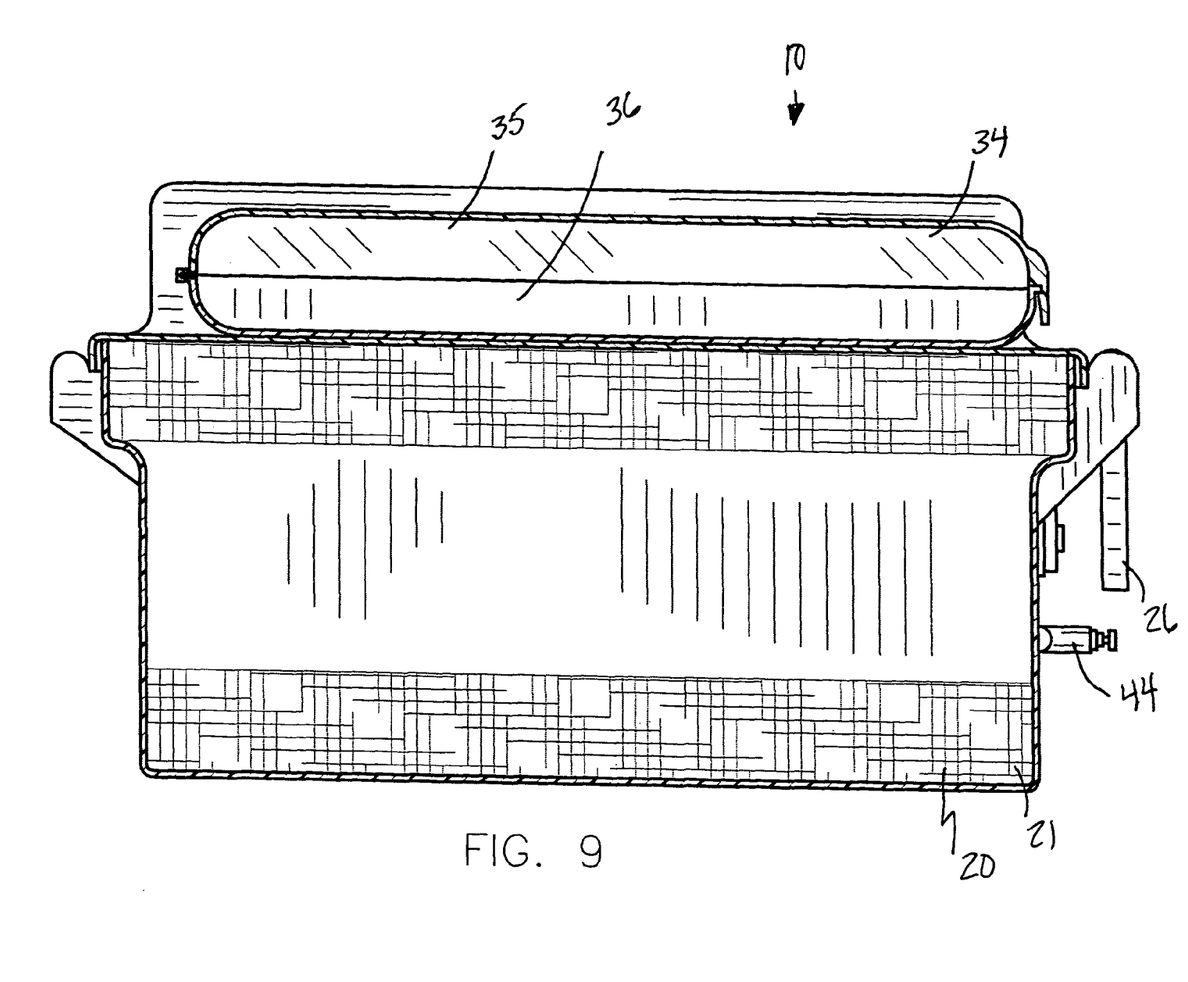
FIG. 9 is a cross sectional view of the system shown in FIG. 1, taken along line 9-9.
Figure 10:
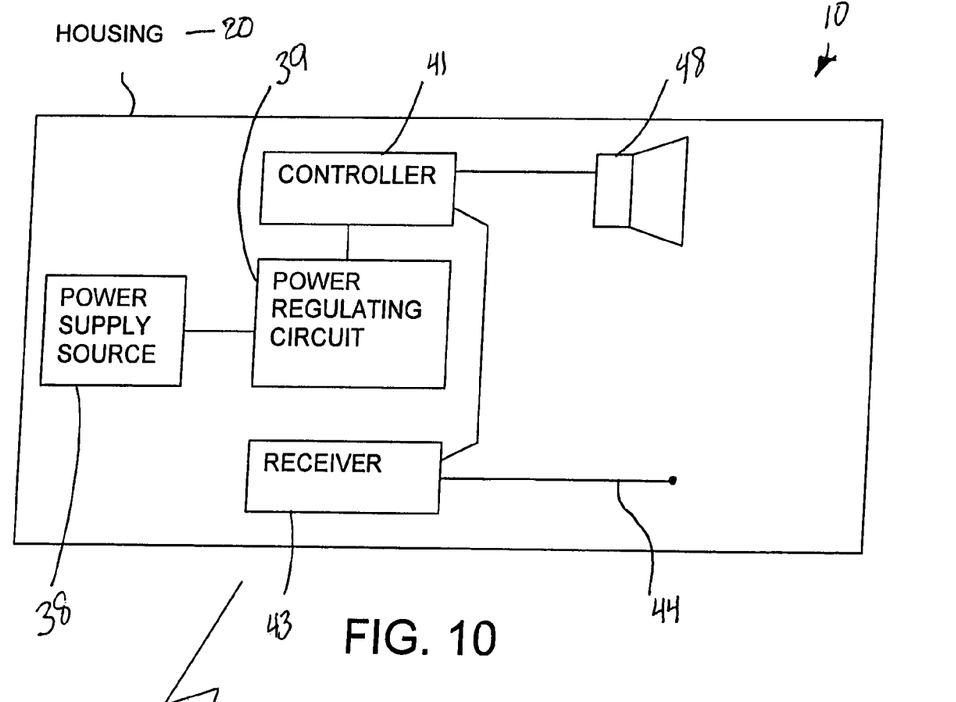
FIG. 10 is a schematic block diagram of the system shown in FIG. 1.
Figure 11:
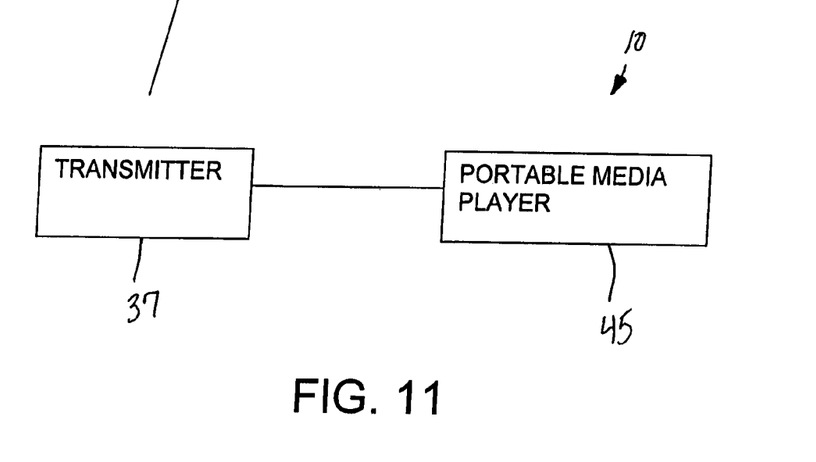
FIG. 11 is a schematic block diagram of the transmitter and the media player, in accordance with the present invention.

Referring to FIG. 11, the housing 20 further includes a transmitter 37 and a portable media player 45 advantageously positioned on a selected body portion of the operator. Such a media player 45 is manually controlled by the user, which is crucial such that selected media files are played back via the transducer upon receiving an instruction from the operator. The media player 45 instructs the transmitter 37 to wirelessly send an RF control signal to the housing 20. The media player 45 includes an electronic media playback device selected from the group including an MP3 player, a compact disc player, a tape recorder, a tuner, and any other appropriate electronic media.

Such a control signal bears data corresponding to a selected media file existing within the media player 45. The receiver 43 transmits the control signal to the controller 41. Such a controller 41 parses the control signal and generates a corresponding output signal that is transmitted to the transducer, which is vital such that the transducer advantageously projects an audible signal indicative of the media file housed within the media player 45. The remote operability of the system 10 provides the unexpected benefit of allowing a hunter to be mobile, or stationary, as desired during hunting conditions, thereby overcoming prior art shortcomings.

Referring to FIGS. 4, 5, 7 and 10, the transducer includes a loud speaker 48 provided with an amplifier for increasing a decibel level of the output signal. The housing 20 has a distal end 33A provided a plurality of apertures 51 formed therein. Such apertures 51 are juxtaposed adjacent to the transducer for allowing the output signal to effectively emanate away from the housing 20 during hunting conditions. Of course, such apertures 51 can be formed in a variety of shapes and sizes, as is obvious to a person of ordinary skill in the art.

The present invention overcomes prior art shortcomings by combining a portable and versatile housing with an RF transmitter directly coupled to a media player and thereby providing the unexpected result of selectively and advantageously distributing animal calling sounds as needed by the hunter.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A communication system for wirelessly transmitting an animal calling signal during hunting conditions, said communication system comprising:
   a portable housing having a base section and a lid pivotally connected directly thereto, said lid being provided with a handle pivotally coupled to a distal end thereof wherein said handle is adaptable between raised and lowered positions while said lid is directly mated with said base section, said housing comprising:
      a power supply source seated within said base section,
      a power regulating circuit electrically coupled directly to said power supply source for selectively adjusting an operating voltage of said communication system during hunting conditions,
      a controller electrically coupled to said power regulating circuit,
      a receiver seated within said housing and including a telescopically adjustable aerial electrically connected directly thereto, and
      a transducer electrically coupled directly to said controller; and
   a transmitter and a portable media player positioned on a selected body portion of the operator, said media player being manually controlled by the user such that selected media files are played back via said transducer upon receiving an instruction from the operator, wherein said media player instructs said transmitter to wirelessly send a control signal to said housing, said control signal bearing data corresponding to a selected media file existing within said media player, said receiver transmitting said control signal to said controller wherein said controller parses said control signal and generates a corresponding output signal that is transmitted to said transducer such that said transducer projects an audible signal indicative of the media file housed within said media player.

2. The communication system of claim 1, wherein said portable media player comprises:
an electronic media playback device selected from the group including an MP3 player, a compact disc player, a tape recorder and a tuner.

3. The communication system of claim 1, wherein said transducer comprises:
a loud speaker provided with an amplifier for increasing a decibel level of said output signal.

4. The communication system of claim 1, wherein said lid is further provided with a chamfered top surface defining a groove longitudinally extending along an entire longitudinal length of said housing, said groove terminating above said base section and including open distal and proximal ends for providing easy access from distal and proximal ends of said housing.

5. The communication system of claim 4, further including a bifurcated casing having pivotally adaptable top and bottom sections nested within said groove, said casing securely shielding said transmitter therein.

6. The communication system of claim 1, wherein said housing has a distal end provided a plurality of apertures formed therein, said apertures being juxtaposed adjacent to said transducer for allowing said output signal to emanate away from said housing during hunting conditions.

7. A communication system for wirelessly transmitting an animal calling signal during hunting conditions, said communication system comprising:
a portable housing having a base section and a lid pivotally connected directly thereto, said housing including a plurality of insulating layers removably positioned along a bottom surface of said base section and an inner surface of said lid respectively, said lid being provided with a handle pivotally coupled to a distal end thereof wherein said handle is adaptable between raised and lowered positions while said lid is directly mated with said base section, said housing comprising:
a power supply source seated within said base section,
a power regulating circuit electrically coupled directly to said power supply source for selectively adjusting an operating voltage of said communication system during hunting conditions,
a controller electrically coupled to said power regulating circuit,
a receiver seated within said housing and including a telescopically adjustable aerial electrically connected directly thereto, and
a transducer electrically coupled directly to said controller; and
a transmitter and a portable media player positioned on a selected body portion of the operator, said media player being manually controlled by the user such that selected media files are played back via said transducer upon receiving an instruction from the operator, wherein said media player instructs said transmitter to wirelessly send a control signal to said housing, said control signal bearing data corresponding to a selected media file existing within said media player, said receiver transmitting said control signal to said controller wherein said controller parses said control signal and generates a corresponding output signal that is transmitted to said transducer such that said transducer projects an audible signal indicative of the media file housed within said media player.

8. The communication system of claim 7, wherein said portable media player comprises:
an electronic media playback device selected from the group including an MP3 player, a compact disc player, a tape recorder and a tuner.

9. The communication system of claim 7, wherein said transducer comprises:
a loud speaker provided with an amplifier for increasing a decibel level of said output signal.

10. The communication system of claim 7, wherein said lid is further provided with a chamfered top surface defining a groove longitudinally extending along an entire longitudinal length of said housing, said groove terminating above said base section and including open distal and proximal ends for providing easy access from distal and proximal ends of said housing.

11. The communication system of claim 10, further including a bifurcated casing having pivotally adaptable top and bottom sections nested within said groove, said casing securely shielding said transmitter therein.

12. The communication system of claim 7, wherein said housing has a distal end provided a plurality of apertures formed therein, said apertures being juxtaposed adjacent to said transducer for allowing said output signal to emanate away from said housing during hunting conditions.

13. A communication system for wirelessly transmitting an animal calling signal during hunting conditions, said communication system comprising:
a portable housing having a base section and a lid pivotally connected directly thereto, said housing including a plurality of insulating layers removably positioned along a bottom surface of said base section and an inner surface of said lid respectively, said lid being provided with a handle pivotally coupled to a distal end thereof wherein said handle is adaptable between raised and lowered positions while said lid is directly mated with said base section, said housing comprising:
a power supply source seated within said base section,
a power regulating circuit electrically coupled directly to said power supply source for selectively adjusting an operating voltage of said communication system during hunting conditions,
a controller electrically coupled to said power regulating circuit,
a receiver seated within said housing and including a telescopically adjustable aerial electrically connected directly thereto, and
a transducer electrically coupled directly to said controller; and
a transmitter and a portable media player positioned on a selected body portion of the operator, said media player being manually controlled by the user such that selected media files are played back via said transducer upon receiving an instruction from the operator, wherein said media player instructs said transmitter to wirelessly send a control signal to said housing, wherein said control signal is an RF signal, said control signal bearing data corresponding to a selected media file existing within said media player, said receiver transmitting said control signal to said controller wherein said controller parses said control signal and generates a corresponding output signal that is transmitted to said transducer such that said transducer projects an audible signal indicative of the media file housed within said media player.

14. The communication system of claim 13, wherein said portable media player comprises:

an electronic media playback device selected from the group including an MP3 player, a compact disc player, a tape recorder and a tuner.

15. The communication system of claim 13, wherein said transducer comprises:

a loud speaker provided with an amplifier for increasing a decibel level of said output signal.

16. The communication system of claim 13, wherein said lid is further provided with a chamfered top surface defining a groove longitudinally extending along an entire longitudinal length of said housing, said groove terminating above said base section and including open distal and proximal ends for providing easy access from distal and proximal ends of said housing.

17. The communication system of claim 16, further including a bifurcated casing having pivotally adaptable top and bottom sections nested within said groove, said casing securely shielding said transmitter therein.

18. The communication system of claim 13, wherein said housing has a distal end provided a plurality of apertures formed therein, said apertures being juxtaposed adjacent to said transducer for allowing said output signal to emanate away from said housing during hunting conditions.

* * * * *